Oct. 22, 1968 CARL-GUNNAR D. ENGSTROM 3,406,682
RESPIRATOR, NARCOSIS APPARATUS OR THE LIKE HAVING
A DELAYED RELEASE SAFETY VALVE
Filed Jan. 26, 1965 3 Sheets-Sheet 1

INVENTOR
Carl-Gunnar Daniel Engström,
BY Pierce, Scheffler & Parker
his ATTORNEYS INVENTOR
Carl-Gunnar Daniel Engstrom,
BY Pierce, Scheffler & Parker
his ATTORNEYS

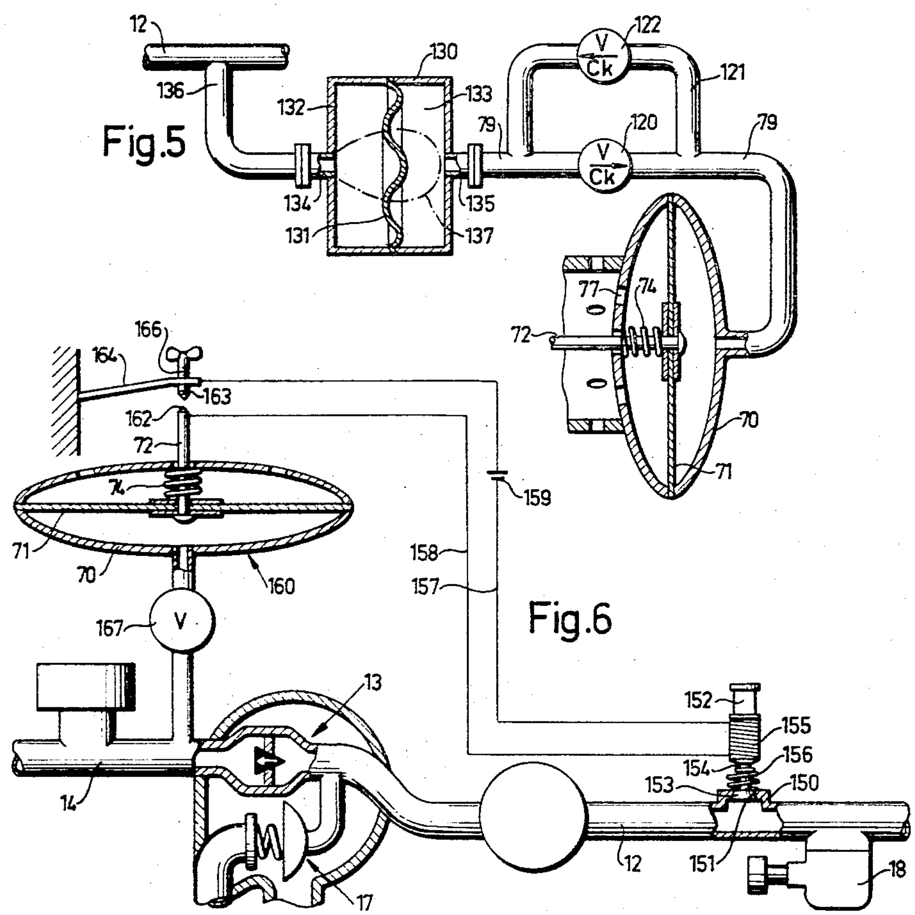
INVENTOR
Carl-Gunnar Daniel Engström,
BY Pierce, Scheffler & Parker
his ATTORNEYS United States Patent Office 3,406,682
Patented Oct. 22, 1968

3,406,682

RESPIRATOR, NARCOSIS APPARATUS OR THE LIKE HAVING A DELAYED RELEASE SAFETY VALVE

Carl-Gunnar Daniel Engstrom, Aluddsvagen 3, Stockholm, Sweden

Filed Jan. 26, 1965, Ser. No. 428,028
8 Claims. (Cl. 128—145.6)

ABSTRACT OF THE DISCLOSURE

In an apparatus for introducing a gas into the respiratory tract of a patient comprising a gas conduit system communicating between a source of such gas under pressure and an attachment for connecting the system with such respiratory tract, a first safety valve responsive to a predetermined overpressure in the system, and a second safety valve with which second safety valve there is combined a release delaying means to delay the release of said second safety valve above a given constant minimum valve-releasing overpressure in the system. This release delaying means comprises a container wherein there is provided a movable partition wall which is connected to said second safety valve in such manner as to actuate said valve by movement of the wall. The container is so connected to the gas conduit system that said wall moves in response to changes in the gas pressure obtaining in said system, there being provided means for delaying movement of said wall for delayed actuation of said second safety valve.

Figure 1:
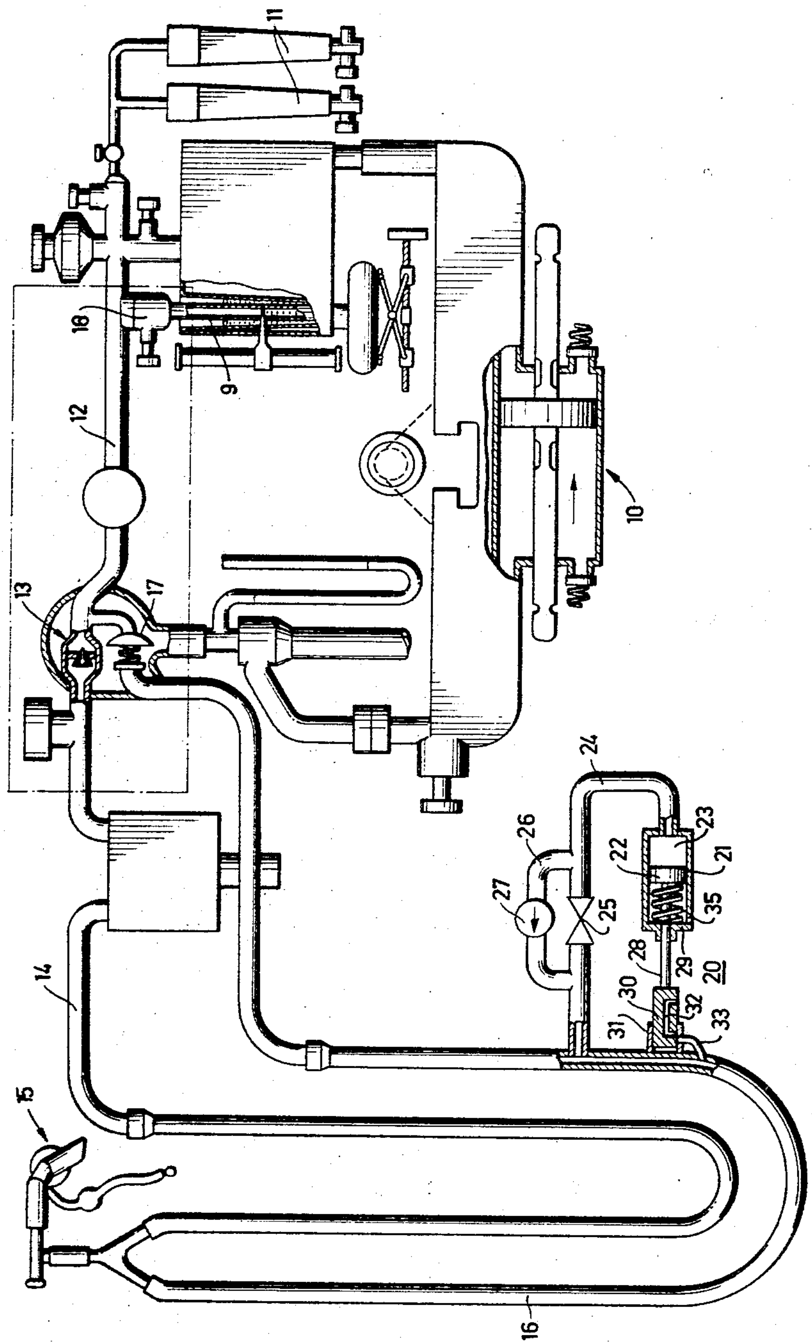

The present invention relates to a respirator, narcosis apparatus or generally an apparatus for introducing a gas, such as air, oxygen, narcosis gas or steam, into the respiratory tract of a patient, and more particularly to such apparatus comprising a gas conduit system connected with a source of pressure gas and provided with an attachment for connecting said system with said respiratory tract and at least one safety valve responsive to a given overpressure in said system.

In apparatus working with direct pressure in the lungs, for instance respirators, narcosis apparatus, etc. overstrain or rupture of the lung tissues may occur in case of malfunction of the apparatus used. This is often avoided by applying a safety valve to the gas conduit system of the apparatus. The safety valve, may, for instance, be adapted to release at an overpressure of about 70 centimeters water column, i.e., a pressure which the lungs can stand for a short period of time. A safety valve of the liquid trap type is particularly suitable in this connection because it prevents dissipation of gas below the safety pressure. However, if the lungs are subjected to such overpressure constantly for a longer period of time, say a couple of minutes or more—which may incidentally happen if at unchanged gas supply the flow path of the gas is blocked by some malfunction of the apparatus—the patient is subjected to great stresses, which can lead to suffocation and ruptures in the lung tissues.

It has now been found, that these drawbacks may be avoided and other advantages gained by providing the apparatus with a second safety valve and in combination therewith a release delaying means constructed and arranged to delay the release of said second valve above a given constant minimum valve-releasing overpressure in the gas conduit system. The delaying means should preferably return to its starting position for closing said valve when the overpressure in said gas system decreases below a given maximum pressure. Preferably, the conventional or first safety valve referred to above should be used in addition to said second or delayed-release safety valve.

The delayed release safety valve may be attached to the gas conduit system, in principle, at any point thereof where excessive pressures may be created and a release would relieve the patient of the harmful overpressure. The impulse for actuating the safety valve shall, of course, be taken from said gas conduit system at a place where an excessive pressure arises, but this place need not be the same as or even be near the place where the valve is fitted. Thus, the impulse may be taken, for instance, from a conduit in direct communication with the patient or the attachment for connecting the system with the patient, whereas said second safety valve proper may be fitted in the conduit in which the source of pressure gas opens, which is usually separated from said attachment by a back pressure valve.

The release delaying device is advantageously set in accordance with the degree of harm to the patient that can be feared, or expected. Thus, for instance, a patient may sustain a relatively low harmful overpressure for longer time than a higher overpressure. Therefore it is also an object of the invention to provide means for adjusting the times of delay relative to the extent of overpressure. According to the invention the delaying means is, therefore, generally so constructed and arranged that the time of delay of the release of said second safety valve is the longer the smaller the releasing overpressure is, and vice versa. The product of the overpressure and the time of delay may with advantage be constant.

In one embodiment of the invention the delaying means comprises a mechanism including a body movable between a position of repose and a position of release, a resilient member arranged to counteract motion of said body from said position of repose towards said position of release, said body being subjected to the action of the gas pressure in said conduit system in a direction to promote motion of said body from said position of repose towards said position of release, said resilient member having a counteracting power adapted to permit said motion of the body above said given minimum valve-releasing overpressure in the system. The power of said resilient member may be adapted to bring about a reverse motion of said body from said position of release towards said position of repose when the gas pressure in the conduit system is below a given maximum value, preferably related to said given minimum valve-releasing overpressure in the system.

The nature of the invention and its objects and advantages will be further defined and explained in the following description and the appended claims. And some illustrative but non-limiting embodiments will now be described with reference to the attached drawings, in which it is shown diagrammatically in:

FIG. 1, a respirator with a device according to the present invention.

Figure 2:
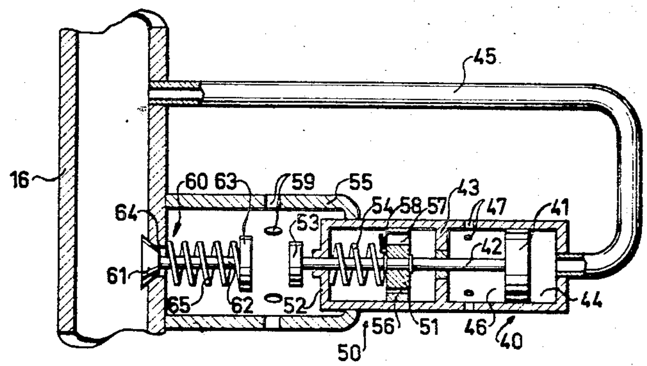
Figure 3:
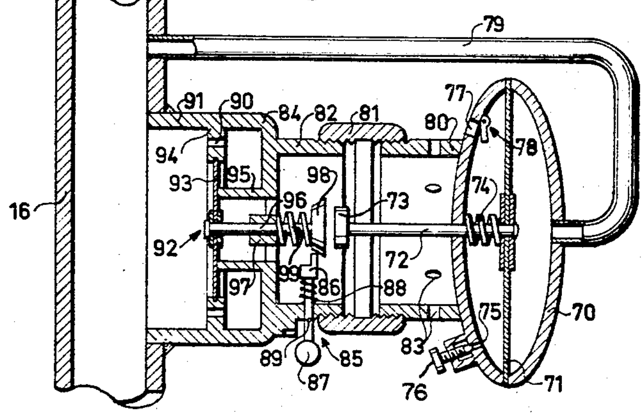

FIGS. 2 and 3 in section other embodiments of the safety valve in the respirator of FIG. 1.

Figure 4:
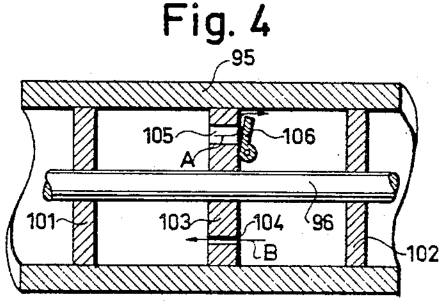

FIG. 4 in section a detail of a safety valve somewhat modified relative to FIG. 3.

FIG. 5, a detail of a further embodiment of the valve of FIG. 3.

FIG. 6, an embodiment with split attachment of safety valve and impulse member.

The respirator diagrammatically shown in FIG. 1 works with a pulsating pressure in the gas conduit system of the respirator and in the broncheal system of the patient. Pressurized gas is supplied to the system via rotameters 11 to a conduit 12. Through the action of a compressor 10, comprising a cylinder in which a piston makes a reciprocating motion, the gas in the conduit 12 is rythmically compressed and pressed from conduit 12 through a back pressure valve 13 into a conduit 14, thereby creating the pulsation in the system. The gas in conduit 14 passes to the attachment 15 by which connection to the lungs is established. The exhaust air is discharged through a conduit 16 and an outlet valve 17. A liquid trap is connected at 18, which acts as a safety valve and prevents the gas pressure by overdosage or possible blocking of the flow path of the gas at the outlet side to increase beyond a predetermined value, for instance 70 centimeters water column. A delayed release safety valve generally indicated at 20 is connected to the conduit 16, but it could as well have been connected to conduit 12 or conduit 14.

The safety valve 20 consists of a cylinder 21, in which a piston 22 is slidably mounted under fluid tight engagement with the walls of the cylinder. The chamber 23 on the one side of the piston 22 is connected by a pressure transmitting conduit 24 with the conduit 16 in the gas system. A valve 25 with restricted passage for the fluid and a by-pass conduit 26 parallel thereto are inserted in the conduit 24, a back pressure valve 27 being inserted in the by-pass conduit. This valve 27 prevents flow in the direction to the cylinder 21 but permits flow in the opposite direction. To the other side of the piston 22 there is attached a piston rod 28, which is passed through the end wall 29 of the cylinder 21, and carries at its outer end a slide 30, which is slidably and air tightly mounted in a tube or sleeve 31 welded to the conduit 16. A branch pipe 33 is connected at one end thereof to the conduit 16 and, at its other end, to the sleeve 31 and opens through a vent opening in the latter against the slide 30 adjacent to a channel 32 in the slide. One end of the channel 32 is normally closed by the sleeve 31 while the other end is open to the ambient atmosphere. A coil spring 35 is mounted around the piston rod 28 between the end wall 29 of the cylinder and the piston.

At normal operation with a pulsating pressure in the gas system the gas cannot significantly displace the piston 22 to the left in FIG. 1, and no gas is let out through the member 30–32. If, however, for instance a blocking of the gas system occurs, which may result in a jamming of the outlet valve 17, the pressure in the system is at once built up to a value which is maximized by the liquid trap at 18 to 70 centimeter water column. The overpressure in the gas conduit 16, at said height or at any predetermined height, gives rise to a gas flow in the conduit 24 to the enclosure 23 in the cylinder 21, the magnitude of the flow being determined by the restriction 25. The piston 22 starts to move to the left when a given minimum pressure, determined by the power of sprign 35, is reached. In spite of the relatively small resistance of the spring 35 the piston 22 will move to the left in the figure with a speed which is proportional to the gas flow in the conduit 24, i.e. to the overpressure in conduit 16. The slide 30 moves inwardly in the sleeve 31 until the channel 32 becomes connected through pipe 33 to the interior of the conduit 16, a free passage to the surrounding atmosphere being then obtained. The pressure in the system then decreases to atmospheric. The piston 22 can now return relatively fast by the action of the spring 35, as the back flow of the gas occurs against a low resistance through the back pressure valve 27 which constitutes a less restricted passage than the restriction 25. Now the channel 32 becomes closed and the pressure in the system may then again build up, for instance to 70 centimeters water column or any predetermined value, after which the above course is repeated.

In FIG. 2 another embodiment of a safety valve according to the invention is shown. In principle the valve consists of a pneumatic cylinder 40 and a hydraulic or pneumatic cylinder generally indicated at 50. A piston 41 is slidably and air tightly mounted in the cylinder 40. The piston has a piston rod 42 fluid tightly and slidably passed through the common wall 43 of the cylinders 40, 50 and is connected to a piston 51 in the cylinder 50. The piston rod 42 extends through the end wall 52 of the cylinder 50, in which it is fluid tightly and slidably mounted, and carries at its free end an engagement member in the form of a cylindrical plate 53. The rod 42 and the pistons 41 and 51 are loaded against the action of release, i.e. movement to the left in the figure, by a coil spring 54. The cylinder 50 is secured to a sleeve 55, which in turn is secured to the conduit 16 and has radial holes 59 in its walls. The enclosure 44 on the outer side of the piston 41 is connected to the conduit 16 by a conduit 45. The chamber 46 on the opposite side of the piston 41 is connected to the surrounding atmosphere by holes 47. In the piston 51, which moves in a completely closed space filled with a liquid, such as oil, or possibly air or another gas, there are two axial passages, one restricted passage 56 and one free passage 57 in which a back pressure valve 58 is mounted, said back pressure valve preventing flow from left to right in the figure but permitting flow in the opposite direction.

A disc valve generally indicated at 60 is inserted in the conduit 16 in alignment with the rod 42. The valve consists of a valve body 61 and a stem 62 mounted thereon, which at its free end carries a cylindrical plate 63. The body 61 cooperates with a valve seat 64 in the wall of conduit 16. The valve body is sealingly pressed against the seat 64 by a coil spring 65 arranged around the stem 62.

The deivce operates in such a manner that at a given constant overpressure in the gas system the pressure is propagated through the tube 45 to the piston 41, which thus starts to move to the left in the figure and together therewith the piston 51. The speed of motion is determined by the resistance set up by the restricted passage 56 to the flow of the fluid therethrough. When the pistons move to the left the plate 53, after some delay, engages the plate 63 on the valve stem 62 and the continued movement has the effect that the valve 60 is opened, and the over-pressure in the gas system dissipates. This causes the pressure on the piston 41 to cease, whereby the pistons by the free flow through the passage 57 and the back pressure valve 58 are quickly displaced to the right by the action of the spring 54, so that the valve 61 can be closed again. When the pressure in the system is again built up the described procedure is repeated.

In FIG. 3 a further preferred embodiment is shown, where, in principle, the cylinders shown in FIG. 3 are replaced by an aneroid-like device consisting of a gas-tight box 70, which is gas-tightly divided by a membrane 71. The box 70 is secured to a tubular sleeve 80, which is screw-threaded into a muff 81 which is in turn screw-threaded on another tubular sleeve 82. The sleeve 82 is attached to the end wall 84 of a tubular member 91, which is welded to the conduit 16. A central stem 72 is attached to the membrane 71, which stem is gas-tightly and displaceably passed through the inner wall of the box, and which at its outer end carries a cylindrical plate 73. A coil spring 74 is mounted about the stem 72 between the wall of the box and the membrane 71. The wall of the box 70 has a central hole through which the stem 72 is passed gas-tightly. It has also two passages 75, 77, in one of which there is a variable restriction 76 while in the other passage 77 a back pressure valve 78 is mounted which prevents flow out from the interior of the box but permits flow in the opposite direction. The space on the opposite side of the membrane is connected with the conduit 16 by a conduit 79.

A membrane valve 92 is mounted in the tubular part 91. The valve consists of a membrane 93, which is fixed at the edge of an inwardly extending flange 94 in the tubular part 91. The membrane 93 gas-tightly engages the rim of a cylindrical sleeve 95, which is attached in a hole in the end wall 84. Centrally of the membrane there is attached a stem 96 which extends outwardly in alignment with the stem 72, and which is slidably journalled in a guide 97 in the hole in the end wall 84. A cylindrical plate 98 is attached at the free end of the stem, and a core spring 99 is arranged between the plate 98 and the guide 97, which spring urges the membrane 93 to sealingly abut the rim of the sleeve 95.

A locking device 85 is arranged in the wall of the sleeve 82, which device consists of a hook member 86, a handle 87 and a spring 88. The locking device 85 can be fixed in an inactive position by a pin 89.

The release device operates in the following way. The pressure in the gas system is propagated through the conduit 79 into the enclosure of the box 70, the membrane 71 being thereby pressed inwardly. At this moment the back pressure valve 78 is closed and the flow out from the box is controlled by the restriction 76. The stem 72 and the plate 73 are thus moved to the left with a predetermined speed, determined by the overpressure in conduit 16, the power of spring 74 and the degree of restriction of member 75, until the plate 73 comes into contact with the plate 98 continued movement of the stem and plate causes the membrane valve 92 to open, whereby gas can flow from the conduit 16 through holes 90 in the flange 94 over the rim of the tubular sleeve 95 and out into the environment by holes 83 in the sleeve 80, so that the overpressure is released. It should be noted that the distance between the two plates 73 and 98 can be adjusted by rotating the muff 81, the two ends of which having inversely directed threads, whereby the time of delay can be regulated. The release causes the pressure in the system to decrease, whereby the membranes 71 and 93—due to the actions of the springs 74 and 99, respectively—rapidly return to their initial positions according to FIG. 3 inasmuch as air enters without flow resistance through the passage 77. Now, if the locking device 85 is fixed in inactive position the membrane valve 92 is reclosed by the action of the spring 99. However, if the locking device 85 is not brought into an inactive position the membrane valve 92 is locked in open position by the locking hook 86, until the locking device 85 is manually withdrawn. It is thus possible by the device of FIG. 3 to obtain either a permanent or a temporary pressure release such as by the devices previously described.

The device shown in FIG. 3 may be modified in a simple manner so as to give a controlled pulsation of the pressure in the system. FIG. 4 shows a detail of such a modified device intended to be incorporated within sleeve 95 of the device of FIG. 3. In the tubular part 95 two walls 101, 102 are arranged, in which the stem 96 is fluid-tightly and slidably journalled. A piston 103 is attached to the stem, which piston is provided with a restricted passage 104 and a free passage 105, in which latter a back pressure valve 106 is mounted, which permits flow from the left to the right but prevents flow in the opposite direction. The piston 103 is thus movable in a closed space defined by the tubular part 95 and the walls 101, 102. The space is preferably filled with a liquid.

The device operates in the following manner, assuming that the locking device 85 is fixed in nonactive position. At a constant overpressure in the system the opening time is determined partly by the restriction 76, partly by the distance between the plates 73, 98. When the membrane valve 92 is opened the stem 96 together with the piston 103 is moved to the left in FIGS. 3 and 4, liquid flowing through the passage 105 in the direction of the arrow A. When the pressure is then released thorugh the valve 92, the membrane 71 in the box and the stem 72 rapidly return to the initial position, permitting the stem 96 and plate 98 to move freely to the right. The return of the membrane valve 92 to its initial position is now controlled by the flow of the liquid through the restriction 104 in the direction of the arrow B, the valve 106 being closed. When the valve 92 is finally closed the pressure in the system is again built up and the procedure is repeated. By this arrangement a controllable pulsation is thus obtained, which can at least temporarily replace the permanent pulsation mechanism.

In FIG. 5 a detail of a somewhat modified device of FIG. 3 is shown. The rest of the device may be identical therewith or be constructed in any suitable way compatible with this modification. A possibly adjustable restriction member 120 and, if desired, a back pressure valve are inserted in the conduit 79, and attached to conduit 79 in parallel with the member 120 there is a by-pass conduit 121 containing a back pressure valve 122 preventing flow in the direction to the box 70 and, if desired, a possibly adjustable restriction. It is possible to replace this device 120–122 by one member in conduit 79 containing a possibly adjustable restricted passage acting in both directions. The stem 72 is non-sealingly led through the rear wall of the box, in which also openings 77 may be arranged to connect the space in the box behind the membrane with the environment.

In principle, the device so far described operates in the same way as the device of FIG. 1. The overpressure in the system causes a gas flow in conduit 79 through the restriction 120, and the membrane 71 starts to move to the left and then opens the outlet valve by means of the stem 72.

It should be noted that the springs, which in the embodiments described return the pressure actuated elements (the piston or the membrane) to the position of repose, are preferably so dimensioned and composed that their active force just slightly exceeds the force which is required for returning the element against the stipulated minimum value of the overpressure in the system.

In addition to the embodiment described above FIG. 5 also illustrates a protection embodiment, which may be applied also to other embodiments of release delaying valve units containing restriction passages, valves etc. that may be polluted or even clogged by moisture or particles circulated in the gas conduit system of a treating apparatus. The present embodiment comprises a protection implement in the form of a box 130 divided by a resilient or flexible membrane 131 into two chamberbers 132 and 133. Each of the walls of said chamber is provided with a stud 134 and 135, respectively, through which gas communication can be established with each chamber. One of the studs 135 is connected to the conduit 79 containing the restriction member 120 and the valve 122, and the other stud 134 is connected to the gas conduit system, here to the conduit 12, over a branch conduit 136. This arrangement has been chosen to show that the delay device, generally, can be attached also to other portions of the system than to the exhaust conduit 16. The pressure variations in conduit 12 are transmitted to the conduit 79 without material loss through the intermediation of the membrane 131 which isolates the possibly polluted gas in the gas system from the more or less sensitive organs in the conduits of the delay device. A modification of this protection embodiment consists of an inflatable bladder 137 air-tightly secured to stud 134, instead of the membrane 131, the dimensions of box 130 being adapted to the dimensions of the bladder.

The safety valve governed by rod 72 (or corresponding members in other embodiments) may be attached to any portion of the gas conduit system where overpressure is likely to arise, for instance to conduit 12 or to the exhaust conduit 16.

In case the safety valve and the delaying device are attached to parts of the gas system at places wide apart electrical implements can be used, as is illustrated in FIG. 6. The safety valve is mounted to the conduit 12, for instance, which has a flat portion 150 and an opening defined by a circular bevelled edge 151 forming a valve seat. Matching said seat a valve body 153 is provided. It has a stem 154 carrying at its outer end a core 152 of magnetic material. A solenoid 155 is provided around the stem so that the core 152 extends outside the solenoid, which is energized through electrical conduits 157 and 158 by a source of electricity 159 when said conduits are short-circuited. The valve body 153 is pressed against the seat 151 by a spring 156, which pulls it outwardly. The impulse for energizing the solenoid 155 is given by the delaying device generally indicated by 160, which may be a device according to any of the embodiments described above. The illustrated device has a chamber unit 70 equal to that of FIG. 5, the delaying members (120–122) of that figure being replaced by one member 167 containing a restricted passage acting in both directions. The rod 72 carries at its tip a contact body 162 connected to conduit 158, and in the path of movement of said tip is another contact body 163 carried by a support 164 and connected to conduit 157. In order to make it possible to regulate the time of delay the position of the body 163 may be adjustable, as by being fitted to the end of a threaded pin 166 screwed in a threaded boring in the support 164.

When the overpressure in conduit 14 is high enough the rod 72 is moved in a direction away from the box 70 and if the overpressure lasts long enough the contact body 162 will contact body 163 to close the electric circuit and the solenoid 155 is then energized so that the stem 154, against the power of the spring 156 is pressed into conduit 12 to open the safety valve and release the overpressure therein.

If it is desired to provide a delayed return of the safety valve 153 an arrangement as that illustrated in FIG. 4 may for instance, be used. The stem 154 may, then be attached to stem 96. Alternatively the solenoid may be arranged in an electric or electromagnetic way to return after some predetermined delay, in a manner known per se.

Any embodiment of the invention may automatically act to create a pulsating pressure of the gas in the conduit system and thus at least temporarily replace the ordinary pulsating mechanism. However, the embodiments equipped with means for delayed return of the safety valve to its closed position are particularly suitable for this purpose.

The invention is not limited to the embodiments disclosed, but various modifications may be made. Thus the different detail units described may be used in any operative combination.

What is claimed is:

1. Apparatus for introducing a gas such as air, oxygen or narcosis gas into the respiratory tract of a patient, comprising a gas conduit system connected to a source of gas under pressure and provided with an attachment for connecting said system with said respiratory tract and at least one safety valve responsive to a given overpressure in said system, a second safety valve and in combination therewith a release-delaying means comprising a container, a movable partition wall arranged therein, means for connecting said wall to said second safety valve for actuating the same by the movement of said wall, means for connecting said container to said gas conduit system, said wall being movable in response to the pressure therein, and means for delaying the movement of said wall for delayed actuation of said second safety valve.

2. Apparatus according to claim 1, in which said delaying means includes means to return said delaying means to its starting position for closing said second safety valve when the overpressure in said gas system decreases below a given maximum pressure.

3. Apparatus according to claim 1, in which said movable wall includes means to allow movement of said wall an adjustable predetermined distance before actuating said second valve for opening the same.

4. Apparatus according to claim 1, in which said container is in fluid communication with said gas system via a restricted passage.

5. Apparatus according to claim 1, in which the delaying means comprises a cylinder and a piston movable therein which piston has an axial restricted passage, the cylinder containing a brake fluid.

6. Apparatus according to claim 1, characterized by a delaying means comprising a cylinder having two end walls, an opening in said cylinder near one of its ends and an aperture in the end wall near the opposite end of said cylinder, a piston enclosed in said cylinder, a pressure-transmitting conduit connecting said opening with said gas system, a restrictive valve in said conduit, a by-pass conduit attached to said pressure transmitting conduit arranged in parallel with and short-circuiting said restricting valve, a back pressure valve in said by-pass conduit permitting flow in the direction from said cylinder but preventing flow in the opposite direction, a stem 28 connected to said piston and gas-tightly passing through said aperture and being axially displaceable therein, a spring between said piston and the end wall at said opposite end of the cylinder pressing the piston towards the first mentioned end of the cylinder, a slide valve comprising a sleeve and a slide axially movable therein, a vent opening in said sleeve, and a vent conduit connecting the vent opening with said gas conduit system, one inner boring and one outer boring in said slide and a channel connecting said borings, said slide being attached to the free end of said stem so as to be movable axially with the stem, said inner boring registering with said vent opening and said outer boring opening to the ambient atmosphere at the axial position taken by said slide when said piston is in its position of release.

7. Apparatus according to claim 1 in which said delaying means comprising a gastight box containing a membrane which divides the box into parts forming a chamber and an enclosure, a pressure transmitting conduit connecting said enclosure to the gas system, a first restricting back pressure valve inserted in said conduit permitting flow from the gas system towards the enclosure but preventing flow in the opposite direction, a by-pass conduit attached to said pressure transmitting conduit in parallel with said restricting back pressure valve, a second restricting back pressure valve inserted in said by-pass conduit permitting flow from the enclosure towards the gas system but preventing flow in the opposite direction; a stem which is attached to the central part of said membrane and is passed through the wall of the chamber and a spring between said membrane and said wall of the chamber counteracting the movement of said membrane towards said wall of the chamber, said stem being adapted in a releasing position to actuate a safety valve in said gas system for delayed opening of same at a given valve-releasing overpressure in said gas system.

8. Apparatus according to claim 1, comprising means for continuous supply of breathing gas to said gas conduit system and means for delayed return of said second safety valve, said means for delayed release and said means for delayed return of said safety valve being adjustably fixed to create breathing pulsation in the gas conduit system to be attached to the patient, the safety valve being attached to the exhalation conduit of the gas conduit system.

References Cited

UNITED STATES PATENTS 2,770,232 11/1956 Falk ------------ 128—145.8

RICHARD A. GAUDET, *Primary Examiner.*

K. L. HOWELL, *Assistant Examiner.*